Feb. 25, 1969  H. H. YOUNG  3,429,672
FUEL FOR CHEMICAL HEATERS
Filed Nov. 7, 1966
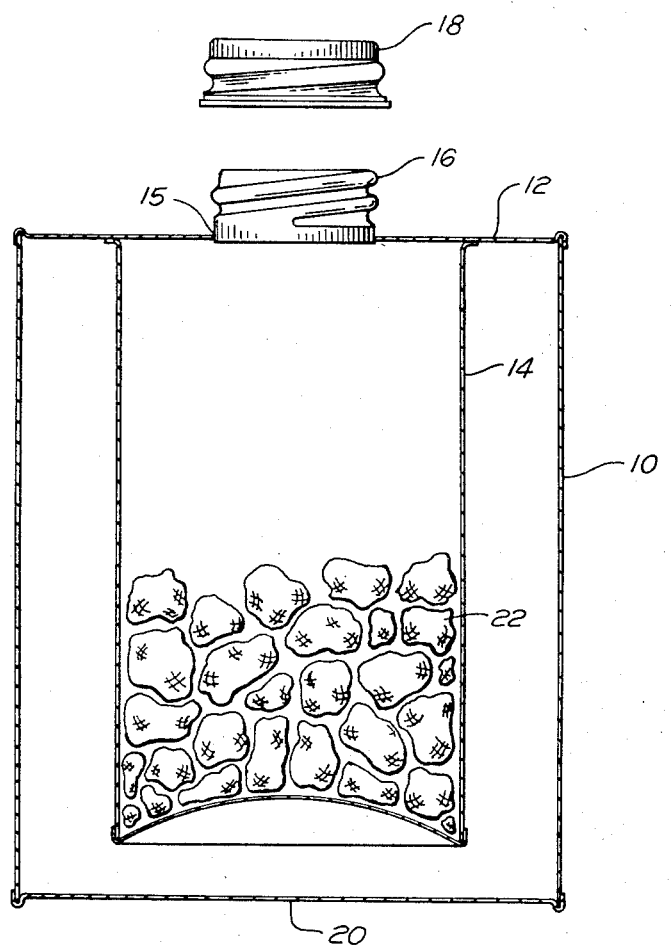
INVENTOR.
HARLAND H. YOUNG
BY E. T. McCabe
ATTORNEY.

United States Patent Office 3,429,672
Patented Feb. 25, 1969

3,429,672
FUEL FOR CHEMICAL HEATERS
Harland H. Young, Western Springs, Ill., assignor to Swift & Company, Chicago, Ill., a corporation of Illinois
Filed Nov. 7, 1966, Ser. No. 592,510
U.S. Cl. 44—3   5 Claims
Int. Cl. F24j 1/00, 1/04

ABSTRACT OF THE DISCLOSURE

Unique fuel composition for chemical heaters, especially self-heating food containers, are disclosed. Such fuels include active lime particles coated with an unsaponifiable oil which has been bodied with a thickening agent.

---

This invention relates to a unique fuel composition for chemical heaters. The fuels of this invention are of the kind adapted to be contained within a suitable casing and which, when provided with the necessary quantity of initiating material, will generate a uniform and sustained heat for the required period of time without danger of explosion for toxicity hazard if leakage were to occur. While not limited hereto, a specific embodiment of this invention relates to a self-heating food can charged with the unique fuel composition.

Chemical heaters have been used to advantage in several situations. For example, flexible containers charged with fuel, which upon activation give off heat, have been used in hospitals and other establishments. Another form of chemical heaters include small heaters adapted to be placed in one's pocket for subsequent use in warming a person's hands or other parts of the body. The term "chemical heater" is broad enough to include all types of heating which arises by chemical reactions, such as that formed by heat of reaction produced by hydration, neutralization, etc.

Of specific importance to campers, hunters, military personnel and others, are the so-called self-heating canned foods which rely on chemical heaters to warm the food product. Particularly during war time or other national emergencies there has been a recurring recognition for the need of canned food products having a safe and satisfactory built-in method for heating.

The idea of a self-heating can is not new, and indeed may efforts have been made in the past to produce satisfactory articles. Numerous chemical heaters have been produced wherein the heat of the chemical reaction has been utilized. One type of fuel utilized in such heaters is that comprising a mixture of a salt and metal higher in the electro-chemical series than the metal of the salt and activated by water. Another method of generating heat is the utilization of heat of crystallization of certain salts. Still another method is the use of gasless compositions, i.e., the reaction of two or more solid inorganic materials which on initiation react with the evolution of heat to form mainly solid products with little or no gas being produced.

While almost an unlimited number of fuel systems have been proposed, they all suffer from one or more drawbacks. The gasless compositions, for example, while not producing explosive gases nevertheless usually comprise toxic materials and hence are hazardous substances in case of leakage. Other disadvantages of various fuel systems include the high cost of the fuel, possibility of explosion by uncontrolled combustion of the fuel, excessive temperatures resulting in scorching the food, noxious gas evolution, possibility of toxicity from poisonous fuels if leakage occurs, etc, Notwithstanding the fact that numerous exotic fuel systems have been proposed, one of the most common fuel systems consists of quicklime which is activated by slaking with water. This hydration of quicklime is adequate to heat canned foods to a palatable temperature; however, such an exothermic reaction is sometimes so rapid that steam is immediately produced resulting in the burning of the hands or other parts of the body of the individual attempting to activate the fuel system. Also, in some instances the heat of reaction is so rapid that the possibility of explosion is quite prevalent.

Accordingly, it is an object of this invention to provide a practical means for controlling the rate of hydration of quicklime.

Another object is to provide a means for spreading out the heat of reaction of a self-heating can fuel so that contents of the can can be heated without worry of explosion or other leakage.

Still another object is to prepare a fuel which will be retarded when activated so as to permit closing of the fuel cell before ejection of steam and loss of heating efficiency.

Additional objects if not specifically set forth herein, will be readily apparent to one skilled in the art from the following detailed description of the invention which follows.

Generally, the present invention concerns a unique lime fuel composition which when initiated with the required quantity of moisture, will generate a uniform and sustained heat for the required period of time without danger of explosion or toxicity hazards. The idea of using lime for fuel is not new, and indeed, many efforts have been used in the past to produce articles using this material as the chief source of fuel. However, the slaking of active lime produces an immediate blowing of steam with the resulting chance of burning the hand or other parts of the body. If the steam is not confined then all heat of the vaporization is lost in the steam instead of through the walls of the container. It has now been found that the rate of hydration of active quicklime can be controlled if the lime is coated with an oil containing a thickening agent. The heat evolved from the hydration of precoated quicklime is adequate to heat canned food product from ambient temperature up to a palatable temperature of between about 125° F. to 170° F.

A specific embodiment of the invention comprises a chemical heater wherein the coated lime particles function as the fuel. An example of such a system is a chemical heater which is a self-heating food container comprising an outer chamber and an inner chamber extending usually more than about ½ the length of the said outer chamber. The inner chamber is capable of withstanding moderate pressure and is adapted to receive the coated lime through an aperture in the top of the container. Securely attached to the top member and centrally surrounding the aperture is a threaded neck projecting outwardly and capable of being closed by a threaded cover or cap.

Turning now to the drawing, 10 is an outer chamber, usually cylindrical in shape such as a cylindrical can of conventional design, provided with a top member or plate 12, to which is attached a smaller inner chamber 14 which also is generally a cylindrical can. The top member contains an aperture 15 which is centrally surrounded by a threaded neck 16 projecting outwardly. In order to close the aperture, a threaded cap 18 is provided to match up with the threaded neck.

One method for manufacturing the can assembly comprises permanently fastening the outer chamber 10, with both top and bottom ends removed, to inner chamber 14 by means of plate or top member 12. The inner chamber is a pressure can of the aerosol type capable of withstanding the temporary steam pressure generated in the fuel well. An aperture 15 is punched in member 12 and is centrally surrounded by threaded neck 16 and cover 18 which is normally provided with a gasket to prevent the escape of steam which is generated after the fuel has been initiated.

The assembly is then inverted so as to reveal the large opening at the bottom of the container through which a food product or other material to be processed is introduced. A bottom member or plate 20 is then permanently attached and the canned food product or like material is then processed in any well known manner. After the canning process is completed the interior of the fuel wall, i.e., the inner chamber 14, is dried with hot air and filled with the coated lime particles 22. The threaded cover or cap 18 is then affixed and the self-heating canned food is ready for storage and eventual heating by the addition of the required amount of water. Such amount is slightly in excess of the stoichiometric requirement for hydration of the lime.

Generally speaking, the unique fuel compositions of this invention are active lime particles having an average size of about ¼ inch to about ¾ inch which have been coated with a non-saponifiable oil thickened with a suitable thickening agent. It has been found that merely coating the lime particles with an oil such as a mineral oil enables one to close or screw on the cap but the reaction is still sufficiently rapid so as to generate a pressurable steam pressure and hence loss of heat by leakage through the cap.

It was subsequently discovered that the addition of a thickening agent to the oil imparted body to the coating. In this way, the heat of reaction spreads from one coated lump of lime to another in such a progressing way as to permit absorption of the heat by the food product almost as fast as it is generated. It is, of course, well recognized that quicklime reacts with water so as to evolve heat. However, lime in industry may be over-fired, under-fired, or partly slaked or carbonated. Some of it is highly porous and sputters when touched with water. Another may have to stand in water for several minutes before "taking off." Therefore it is preferred, for purposes of this invention, to use highly active lime suitably protected by a coating so as to produce uniform heating results. It is therefore apparent that the coating should be applied to the properly sized freshly fired quicklime thereby protecting it from moisture and carbon dioxide until activated by the water at the proper time.

More in detail as to the coating composition, it is pointed out that the base of the composition comprises about 88% to about 99%, preferably 95% to 99% of an oil selected from the class including mineral oils, microcrystalline waxes, cyclo paraffines or other unsaponifiable water insoluble materials. For purposes of the invention, an oil is meant to include liquids that are not miscible with water, generally combustible and not readily reactive with lime. They are soluble in ether. By mineral oils is meant fuel oils, paraffin oils, greases, naphthenes and lubricants derived from such materials as petroleum and its products normally consisting of hydrocarbons. If it were not for the possible saponification and hence dissipation of heat, one could use saponifiable fatty oils and waxes. In fact many of these are quite suitable if the fuel system is not stored for too long a time. The same is particularly true of higher alcohols, ketones and petroleum waxes.

In order to impart body to the oil, about 1–20%, preferably 1–12%, of a thickening agent is added to the oil base prior to coating the lime particles. Detailed experimentation revealed that wax in excess of about 20% produced a coating that almost completely prevented slaking with water. For purposes of this invention, a wax is defined as a material consisting of mixtures of esters, fatty acids, high molecular weight alcohols and hydrocarbons. Waxes are one of a group of plastic substances obtained from plants or deposited by insects and consists of esters of higher fatty acids with higher alcohols. Examples of such esters of higher fatty acids and higher alcohols include melissyl palmitate (beeswax) and cetyl palmitrate (spermaceti). In general waxes differ from fats in that they are the esters of monohydric higher alcohols whereas fats are the fatty acid esters of polyhydric alcohols (gylcerol).

In place of part or all the wax, one may use a soap as the thickening agent for the oil. Examples include the alkali and alkaline earth metals as well as the aluminum salts of fatty acids having an average of about 8 to 30 carbons in the acyl chain. Specific representative members include: calcium and magnesium stearates and palmitates (alkaline earth tallow soaps). Sodium soaps are equally suitable and not only provide the desired thickening of the coating oil but render the penetration of the slaking water more predictable yet not so rapid as to make can closure difficult.

Aluminum soaps are exceptionally fine thickeners when dissolved in the petroleum product in quantities as low as 1%.

Insofar as the fuel system is concerned, the lime particles are coated by immersing in the oil at about 70° to 130° C. Other temperatures are operable, but it has been found that these are the most desirable working temperatures. Such a treatment produces a well coated fuel containing about 65% to 85% lime and 35% to 15% oil thickening agent coating. While it is preferred to use microcrystalline petroleum wax because of its adhesive properties, it should be noted that other thickening agents function with equal facility.

The ratio of fuel to food may range from approximately 1:1 to 1:6 depending upon the specific heat of the food, the amount of insulation provided, the ambient temperature of the canned food and the degree of heating desired. Further, the type of food is important as it will be readily recognized that not as much heat is required for beef stew, for example, as compared to a hot beverage in order to be equally palatable. A non-inclusive list of suitable foods includes chicken a la king, lamb stew, beef stew, spaghetti and meat balls, cream type soups, thick soups, pork and beans, chili con carne, etc. Generally speaking, when warming a thin fluid food, no problem is encountered because of the rapid heat transfer. However, one of the outstanding features of the instant invention is that "slow heating" foods may be handled conveniently with no scorching since the quantity of heat available is sufficient but does not localize or generate a temperature so high as to burn or scorch as is normally the case with combustion or other highly exothermic reactions.

Related to the ratio of fuel to food is the relative size of the outer chamber compared to the inner chamber. It is readily recognized that the size of the chambers may vary over wide ranges depending upon capacities desired. In regard to the fuel well, i.e., the inner chamber, it should be of sufficient size to provide ample free space for the marked expansion that accompanies the conversion of $CaO$ to $Ca(OH)_2$. The space is essential to prevent bursting of the inner chamber. In any event, a distinct advantage in using lime coated with a nontoxic petroleum or paraffin oil is the fact that even if slight leakage did occur, no harmful toxicity would result since chemicals used are innocuous. Further the flavor would immediately disclose the fact that the inner fuel can had malfunctioned.

In the slaking of lime, water in an amount of approximately ⅓ the weight of the active lime is required. In order to assure that all the potential heat is released, one should use a slight stoichiometric excess of water. Excess water over that required to hydrate the lime produces steam pressure and therefore the inner chamber must be constructed so as to withstand moderate pressure.

The coated lime particles are initiated by coming in contact with the water. The exothermic reaction starts at room temperature in about 1 to 2 minutes after the addition of water or aqueous solution (i.e., water-alcohol solution can be used when the ambient temperature is so cold that the water would normally be frozen) which time is ample to effect closing of the cover. Generally speaking about 8 to 10 minutes is sufficient for the food to pick up all the sensible heat available. Further, loss of heat by radiation can be reduced by using any convenient wrapping material as insulation. In some instances a rapid, jarring shake or two ruptures the lime coating so as to initiate the reaction.

The following examples are presented to illustrate the invention. It will be understood that these examples are for illustrative purposes only and should not be taken in any manner as limiting the invention which is defined by the appended claims. Cans were made to order so as to contain 500 gms. of food and 200 gms. of coated fuel, although several other sizes might have served as well.

EXAMPLE I 10 parts of active quickline (average size lumps of ½ inch diameter) was immersed in Nujol (a heavy mineral oil) containing about 5%, based on the weight of the oil, of a microcrystalline petroleum wax. The free oil-wax composition was drained leaving 14 parts of coated active lime. A canned food product was assembled wherein approximately 200 grams of fuel (150 grams of lime and 50 grams of coating) was placed in the inner chamber and 500 grams of tomato cream soup was placed in the outer chamber. The fuel was activated by being contacted with approximately 65 grams of water and the inner can was capped tightly. After one jarring shake the reaction started and the entire assembly was wrapped in a towel. After 7 minutes the can was opened and the food product was found to be at 158° F., ideal for consuming as soup.

EXAMPLE II 10 parts of active quicklime having an average particle size of about ⅜ inch in diameter was covered with a mineral oil solution (SAE 10) containing about 1% of aluminum stearate. The particles were immersed in the oil solution at a temperature of about 120° C. After draining free from the excess oil the coated lime was dried and placed in the inner chamber of the food can. Approximately 190 grams of fuel (160 grams of lime and 30 grams of aluminum stearate-mineral oil coating) was utilized in conjunction with 500 grams of beef stew. Sixty-five grams of water was utilized in activating the fuel which raised the temperature of the product to 162° F. in 8 minutes.

EXAMPLE III

To a mineral oil solution containing about 20% microcrystalline wax at a temperature of 80° C. is added approximately an equal weight of active quicklime and agitated for a period of 15 seconds. Thereafter the hot coating is drained from the lime particles and they were blotted to remove excess coating oil. They were then charged into the inner chamber of the self-heating can. Using a ratio of 195 grams of fuel to 450 grams of food, a pork and bean food product was raised to a temperature of 170° F. in about 10 minutes after activating the fuel with 70 gms. water.

EXAMPLE IV

Lime was coated by submerging into paraffin oil which contained 1% aluminum stearate and 5% microcrystalline wax (basis paraffin oil). After submersion the coating composition was drained immediately and the fuel was left exposed to the ambient atmosphere overnight. Sixteen hours later 180 gms. of the fuel was charged into the inner can and 425 gms. of chicken a la king was placed in the food compartment. Seventy grams water was then used to actuate the fuel and the cell was closed. Two rapid shakes initiated the reaction and within 6 minutes the average temperature of the chicken a la king had reached 158° F.

Examples below were prepared by using the same relative amounts of food (500 gms.) and fuel (200 gms.). In every case the fuel was coated by dipping the lumps of quicklime into a hot solution (140° F.) comprising 70% mineral oil (SAE 20), 20% paraffin wax and 10% calcium stearate. The lumps were allowed to drain during cooling and each can was charged into the can.

| Example No. | Food | Temperature at start (° F.) | Time of heating (min.) | Final temperature (° F.) |
|---|---|---|---|---|
| V | Coffee | 34 | 4 | 160 |
| VI | Chocolate in skimmed milk with sugar. | 45 | 5 | 165 |
| VII | Chili con carne | 60 | 7 | 170 |
| VIII | Spaghetti and meat balls (¾″). | 65 | 8 | 164 |
| IX | Chicken chop suey | 55 | 6 | 160 |

Obviously many modifications and variations of the invention as set forth herein may be made without departing from the spirit and scope of the invention, and therefore only such limitations should be imposed as are indicated in the appended claims.

I claim:
1. A fuel composition, suitable for use in a self-heating food container, which comprises lime particles of an average size of between about ¼ inch and about ¾ inch and coated with about 15% to about 35%, based on the weight of the lime particles, of a non-saponifiable oil bodied with a thickening agent.

2. The composition of claim 1 wherein the non-saponifiable oil is bodied with a member selected from the group consisting of waxes and metal soaps.

3. The composition of claim 1 wherein the non-saponifiable oil is a mineral oil and is bodied with about 1% to about 20%, based on the weight of the oil, of a microcrystalline petroleum wax.

4. The composition of claim 1 wherein the non-saponifiable oil is bodied with a small amount of a metal soap.

5. The composition of claim 4 wherein the metal soap is an aluminum soap of a fatty acid having an average of about 8 to about 30 carbons in the acyl chain.

References Cited

UNITED STATES PATENTS

| 1,283,546 | 11/1918 | Olson | 106—119 |
| 1,892,389 | 12/1932 | Evans | 44—3 |
| 2,207,336 | 7/1940 | Yanick | 106—315 |
| 2,425,900 | 8/1947 | Steven | 44—3 |

FOREIGN PATENTS 1,366,010  6/1964  France.

DANIEL E. WYMAN, *Primary Examiner.*

CARL F. DEES, *Assistant Examiner.*

U.S. Cl. X.R.

126—263